(12) United States Patent
Klein et al.

(10) Patent No.: US 8,104,012 B1
(45) Date of Patent: Jan. 24, 2012

(54) SYSTEM AND METHODS FOR REDUCING CLOCK POWER IN INTEGRATED CIRCUITS

(75) Inventors: Matthew H. Klein, Redwood City, CA (US); Edward S. McGettigan, San Jose, CA (US); Stephen M. Trimberger, San Jose, CA (US); James M. Simkins, Park City, UT (US); Brian D. Philofsky, Longmont, CO (US); Subodh Gupta, Belmont, CA (US)

(73) Assignee: Xilinx, Inc., San Jose, CA (US)

( * ) Notice: Subject to any disclaimer, the term of this patent is extended or adjusted under 35 U.S.C. 154(b) by 304 days.

(21) Appl. No.: 12/363,721

(22) Filed: Jan. 31, 2009

(51) Int. Cl.
*G06F 17/50* (2006.01)
(52) U.S. Cl. ........................................ 716/132; 716/105
(58) Field of Classification Search .................. 716/100, 716/132, 105
See application file for complete search history.

(56) References Cited

U.S. PATENT DOCUMENTS

| | | | |
|---|---|---|---|
| 5,315,181 A | 5/1994 | Schowe | |
| 5,452,239 A * | 9/1995 | Dai et al. | 703/19 |
| 5,914,616 A | 6/1999 | Young et al. | |
| 5,980,092 A | 11/1999 | Merryman et al. | |
| 6,204,695 B1 | 3/2001 | Alfke et al. | |
| 6,272,667 B1 * | 8/2001 | Minami et al. | 716/108 |
| 6,288,568 B1 | 9/2001 | Bauer et al. | |
| 6,313,683 B1 | 11/2001 | Block et al. | |
| 6,456,115 B2 | 9/2002 | Li et al. | |
| 6,668,363 B2 * | 12/2003 | Minami et al. | 716/113 |
| 6,782,486 B1 | 8/2004 | Miranda et al. | |
| 7,126,406 B2 | 10/2006 | Vadi et al. | |
| 7,129,765 B2 | 10/2006 | Vadi et al. | |
| 7,372,299 B2 | 5/2008 | Vadi et al. | |
| 7,414,430 B2 | 8/2008 | Vadi et al. | |
| 7,518,401 B2 | 4/2009 | Vadi et al. | |
| 2001/0029599 A1 * | 10/2001 | Minami et al. | 716/6 |
| 2005/0242866 A1 | 11/2005 | Vadi et al. | |

(Continued)

FOREIGN PATENT DOCUMENTS

WO   WO 02/14993 A2   2/2002

OTHER PUBLICATIONS

U.S. Appl. No. 12/363,722, filed Jan. 31, 2009, Matthew H. Klein et al., Xilinx, Inc. 2100 Logic Drive, San Jose, CA 95124.

(Continued)

*Primary Examiner* — Suchin Parihar
(74) *Attorney, Agent, or Firm* — Kevin T. Cuenot; Mark E. Courtney

(57) ABSTRACT

Dynamic power savings and efficient use of resources are achieved in a programmable logic device (PLD) such as a field programmable gate array (FPGA) or complex programmable logic device (CPLD) by receiving a design netlist specifying a circuit including clock signals, clock buffers, clock enable signals and synchronous elements, examining the design netlist to identify synchronous elements coupled to common clock and clock enable signals, cutting the clock signals to the synchronous elements to form a modified design netlist, inserting gated clock buffers into the modified netlist to output gated clock signals to the synchronous elements, responsive to the clock enable signals, and performing placement and routing on the modified netlist. A system for performing the method on an EDA tool is provided. The methods may be provided as executable instructions stored on a computer readable medium which cause a programmable processor to perform the methods.

20 Claims, 14 Drawing Sheets

U.S. PATENT DOCUMENTS

| | | | |
|---|---|---|---|
| 2008/0059923 A1* | 3/2008 | Sasaki et al. | 716/4 |
| 2009/0055781 A1* | 2/2009 | Araya | 716/3 |
| 2009/0217068 A1* | 8/2009 | Fernsler et al. | 713/322 |

OTHER PUBLICATIONS

Xilinx, UG070, Virtex-4 FPGA Users Guide, Jun. 17, 2008, available from Xilinx, Inc., 2100 Logic Drive, San Jose, California 95124, or at the web url www.xilinx.com/support/documentation/user_guides/ug070.pdf.

Xilinx ISE 8 Software Manuals and Help—PDF Collection, Dec. 12, 2005, 16 pages, available at the internet url http://www.xilinx.com/itp/xilinx8/books/manuals.pdf.

Wang et al., "Clock Power Reduction for Virtex-5 FPGAs", FPGA2009, Feb. 22-24, 2009, 10 pages.

* cited by examiner

| Control Set | Control Set Defintion | DSPs | BRAMs | FFs |
|---|---|---|---|---|
| 1 | CE1, SyncRes1, AsyncRes1, Clk1 | | 2 | 8 |
| 2 | CE2, SyncRes2, AsyncRes2, Clk2 | 3 | | 5 |
| 3 | CE3, SyncRes3, AsyncRes3, Clk3 | | 1 | 6 |
| 4 | CE4, SyncRes4, AsyncRes4, Clk4 | | | 3 |

FIGURE 5

SYSTEM AND METHODS FOR REDUCING CLOCK POWER IN INTEGRATED CIRCUITS

RELATED APPLICATIONS

This application relates to U.S. application Ser. No. 12/363,722, filed Jan. 31, 2009, entitled "Clock Distribution to Facilitate Gated Clocks", by Matthew H. Klein et al., which application is hereby incorporated herein by reference in its entirety.

FIELD OF THE INVENTION

One or more embodiments of the present invention relate, in general, to the design process for integrated circuits such as programmable logic devices (PLDs) including field programmable gate arrays (FPGAs) and complex programmable logic devices (CPLDs). More particularly, one or more embodiments of the invention are applicable to a system and method for facilitating reduced power gated clock design in integrated circuits such as PLDs including FPGAs or CPLDs.

BACKGROUND

In designing and fabricating integrated circuits, PLD devices such as FPGA and CPLD devices are frequently used. A circuit designer typically approaches the design of a device using PLD technology by accessing a library of known functions, which are selected as circuit elements, and which are then coupled together using design tools to form useful circuitry. The output of the design process is typically a netlist of wired connections, or other connectivity information, coupling instances of the selected circuit elements. Circuit elements in such libraries include relatively low level devices such as input and output buffers, clock buffers, NAND and NOR gates. Circuit elements may further include higher level devices such as registers, flip-flops, register files, memory arrays, and even processors or CPUs, and specialized functions such as digital signal processors (DSPs) may be provided as library elements.

By selecting the necessary circuit elements and coupling them together, a circuit designer can quickly create a new functional integrated circuit. Because PLD technology allows automated tools (electronic design automation or "EDA" tools) to program a pre-existing completed packaged integrated circuit device, the integrated circuit can quickly be completed as a physical device and tested. In contrast, the manufacture of custom, semi-custom or application specific integrated circuits (ASICs) requires that the circuit designer complete the design and then wait for silicon devices to be manufactured, packaged, tested and delivered as integrated circuits before the physical devices are available. Thus, PLD technology allows fast design, verification and production of integrated circuits. Further, certain PLD devices are programmed using non-volatile memory devices or even one time programmable elements to contain the programming, e.g. the interconnect selections and the circuit functional selections. Since in some cases these devices can be reprogrammed, changes to the design or modifications to fix errors in the design may be made quickly and without the need for waiting for additional silicon manufacture to occur.

Like many integrated circuits, present PLD designs use more power than is desirable. Power consumed may be described as static and dynamic power. Dynamic power is consumed during circuit operations when one or more elements of the circuit are changing state. One approach to saving dynamic power in current PLDs, such as FPGAs or CPLDs, which are typically CMOS logic devices, is to provide clock enables to the clocked elements including registers or flip-flops. When the clock to a clocked element is disabled by an enable signal, the register or flip-flop transistors coupled to the clock line will not change state, thus saving dynamic power. When a particular circuit element that is clocked is not in use, the circuit can selectively disable the clock to that portion, and thereby save power that would otherwise be consumed with each clock transition.

However, the use of many of these clock enable lines in an FPGA design places a high demand on the routing area and driving buffer resources of the device. The clock enable line is an additional signal, in addition to the clock signal, that is now routed to many clocked elements on the programmed integrated circuit. In some prior art FPGAs, the clock enable lines are even routed to some circuits where they are never used. The clock enable lines therefore take up valuable routing circuit area, limiting the availability of routing area for other purposes. The clock enable lines may be heavily loaded and require substantial driving buffers, a limited resource on an FPGA or CPLD. In addition, these buffers may consume additional power.

The use of clock gating circuits to save dynamic power in synchronous circuitry used in PLDs continues to increase. A continuing need thus exists for improved gated clock distribution methods in these PLD devices without the disadvantages of the prior art.

SUMMARY

These and other problems are generally solved or circumvented, and technical advantages are generally achieved, by advantageous embodiments of the present invention which include methods for modifying, for example, an FPGA netlist to efficiently provide gated clock signals to conserve dynamic power consumption.

In one exemplary embodiment, an FPGA or CPLD integrated circuit is provided, comprising a programmable clock network. The clock network receives a clock input signal and has routing portions for distributing clock signals responsive to the clock input signal, and the programmable clock network is operable to independently and dynamically enable various portions of the clock network. Methods are used to convert portions of the clock network to efficiently distribute gated clock signals in the netlist for reducing dynamic power consumption.

In another exemplary embodiment, a method is provided for providing a design in an integrated circuit, by providing a design netlist including synchronous elements receiving clock signals and clock enable signals on clock and clock enable routing signals; identifying in the design netlist groups of synchronous elements with common clock and clock enable signals; for a particular one of the groups, cutting the original clock line to the synchronous elements. One or more gated clock buffers is added to the netlist to drive a gated clock to the synchronous elements, responsive to the original clock line, the gated clock buffer having a control input. The corresponding clock enable signal is then coupled to the gated clock buffer in the netlist. The clock enable signal is then removed from the synchronous elements now receiving the gated clock; and the original clock enable routing signals are removed from the design netlist to form a modified netlist. A subsequent place and route step is performed and a programming file such as a bitfile or bitstream file is created to program the PLD which may be, for example an FPGA with the modified netlist.

In another exemplary embodiment, a method for providing gated clock signals in an integrated circuit having a hierarchical clock network is provided. A design netlist is received following any of a design, translate, map, pack or place and route step for a circuit to be implemented in the integrated circuit, the design having a hierarchical clock network and having one or more clock enable signals coupled to synchronous elements in the design netlist. A process is performed identifying in the design netlist groups of synchronous elements with common clock and clock enable signals. For some of the groups, the netlist is modified by cutting the original clock line to the synchronous elements and adding one or more gated clock buffers to drive a gated clock to the synchronous elements, responsive to the original clock line, the gated clock buffer having a control input. The control input is then coupled in the netlist to the clock enable signal. The process continues modifying the netlist by removing the clock enable signal from the synchronous elements; and removing the clock enable routing signals from the design netlist to form a modified netlist. In additional embodiments, a power analysis is performed on the modified netlist to confirm that a power savings is accomplished. If the modified netlist does not achieve a power savings over a threshold, the modifications are discarded. The design process then continues to completion using the modified netlist to form a programming file such as a bitstream or bitfile for a PLD such as an FPGA or CPLD with the gated clock signals.

In another exemplary embodiment, a computer readable medium storing executable instructions is provided. When these instructions are executed by a programmable processor, the processor performs the method of: receiving a design netlist following any one of several design processes including design, translate, map, pack or place and route processes for a circuit to be implemented in an integrated circuit, the design having a hierarchical clock network and having one or more clock enable signals coupled to synchronous elements in the design netlist; identifying in the design netlist groups of synchronous elements with common clock and clock enable signals; for a particular one of the groups, cutting the original clock line to the synchronous elements; adding one or more gated clock buffers to drive a gated clock to the synchronous elements, responsive to the original clock line, the gated clock buffer having a control input; coupling the clock enable signal to the gated clock buffer; removing the clock enable signal from the synchronous elements; and removing the clock enable routing signals from the netlist to form a modified netlist. The design process then continues to completion with the modified netlist.

The descriptions of the embodiments in this section are only examples and are in summary form and the description does not limit the invention, the embodiments or the appended claims. Additional advantages, details, features and additional embodiments are described in the detailed description that follows.

BRIEF DESCRIPTION OF THE DRAWINGS

For a more complete understanding of the invention, and the advantages thereof, reference is now made to the following descriptions taken in conjunction with the accompanying drawing, in which:

FIG. 5 depicts in a table four sets of the synchronous elements of FIG. 4 with common clock and control signals;

DETAILED DESCRIPTION

Although the example embodiments described herein are primarily described as directed to FPGA devices, the reader should understand that these are examples and the embodiments are generally applicable to PLD devices including without limitation CPLD and FPGA devices and PLD devices that are being produced combining aspects of both CPLD and FPGA devices.

Figure 1:
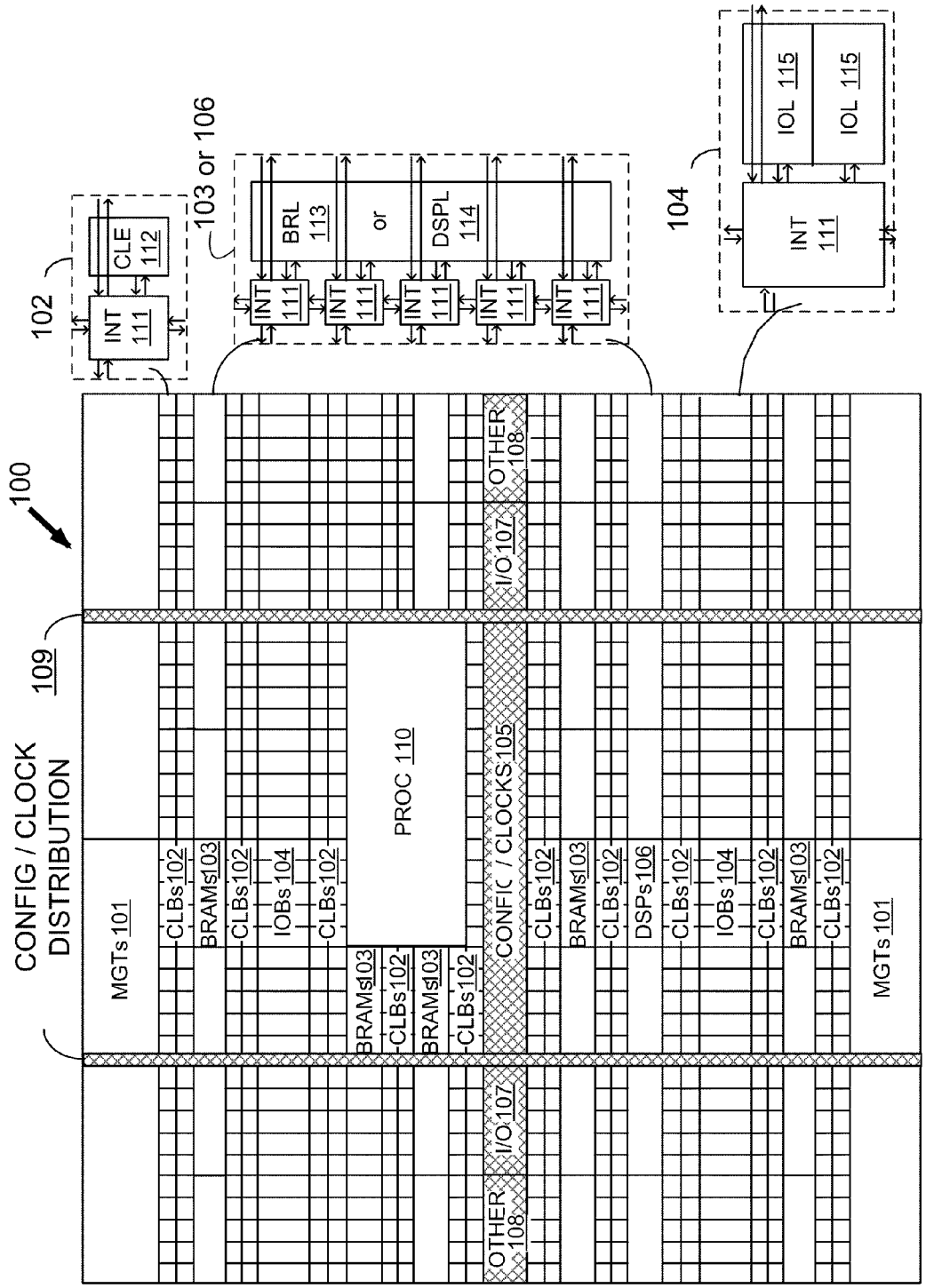
FIG. 1 depicts an FPGA device of the prior art having a clock distribution network.

FIG. 1 depicts as an illustrative non-limiting example, a commercially available prior art FPGA presented in a block diagram. This Virtex™-4 FPGA device is available from Xilinx, Incorporated, the assignee of the present application, and is described in detail in the Xilinx datasheet entitled "Virtex-4 FPGA Users Guide" published Jun. 17, 2008, and available from Xilinx, Inc., 2100 Logic Drive, San Jose, Calif. 95124, or at the web url www.xilinx.com/support/documentation/user_guides/ug070.pdf; which document is hereby incorporated herein by reference. (Xilinx, Inc., owner of the copyright, has no objection to copying these and other pages referenced herein but otherwise reserves all copyright rights whatsoever.) Young, et al. further describes the interconnect structure of the Virtex™ FPGA in U.S. Pat. No. 5,914,616, issued Jun. 22, 1999, and assigned to the assignee of the present application, entitled "FPGA Repeatable Interconnect Structure with Hierarchical Interconnect Lines", which is hereby incorporated herein by reference in its entirety.

As noted above, advanced FPGAs can include several different types of programmable logic blocks in the array. For example, FIG. 1 illustrates an FPGA architecture 100 that includes a large number of different programmable tiles including multi-gigabit transceivers (MGTs) 101, configurable logic blocks (CLBs) 102, random access memory blocks (BRAMs) 103, input/output blocks (IOBs) 104, configuration and clocking logic (CONFIG/CLOCKS) 105, digital signal processing blocks (DSPs) 106, specialized input/output blocks (I/O) 107 (e.g., configuration ports and clock ports), and other programmable logic 108 such as digital clock managers, analog-to-digital converters, system monitoring logic, and so forth. Some FPGAs also include dedicated processor blocks (e.g., PROC 110).

In some FPGAs, each programmable tile includes a programmable interconnect element (INT) 111 having standardized connections to and from a corresponding interconnect element in each adjacent tile. Therefore, the programmable interconnect elements taken together implement the programmable interconnect structure for the illustrated FPGA. The programmable interconnect element (INT) 111 also includes the connections to and from the programmable logic element within the same tile, as shown by the examples included at the top of FIG. 1.

For example, a CLB 102 can include a configurable logic element (CLE) 112 that can be programmed to implement user logic plus a single programmable interconnect element (INT) 111. A BRAM 103 can include a BRAM logic element (BRL) 113 in addition to one or more programmable interconnect elements. Typically, the number of interconnect elements included in a tile depends on the height of the tile. In the pictured embodiment, a BRAM tile has the same height as four CLBs, but other numbers (e.g., five) can also be used. A DSP tile 106 can include a DSP logic element (DSPL) 114 in addition to an appropriate number of programmable interconnect elements. An IOB 104 can include, for example, two instances of an input/output logic element (IOL) 115 in addition to one instance of the programmable interconnect element (INT) 111. As will be clear to those of skill in the art, the actual I/O pads connected, for example, to the I/O logic element 115 are manufactured using metal layered above the various illustrated logic blocks, and typically are not confined to the area of the input/output logic element 115.

In the pictured embodiment, a horizontal area near the center of the die (shown shaded in FIG. 1) is used for configuration, clock, and other control logic. Vertical areas 109 extending from this horizontal area are used to distribute the clocks and configuration signals across the breadth of the FPGA.

Some FPGAs utilizing the architecture illustrated in FIG. 1 include additional logic blocks that disrupt the regular columnar structure making up a large part of the FPGA. The additional logic blocks can be programmable blocks and/or dedicated logic. For example, the processor block PROC 110 shown in FIG. 1 spans several columns of CLBs and BRAMs.

Note that FIG. 1 is intended to illustrate only an exemplary FPGA architecture. For example, the numbers of logic blocks in a column, the relative width of the columns, the number and order of columns, the types of logic blocks included in the columns, the relative sizes of the logic blocks, and the interconnect/logic implementations included at the top of FIG. 1 are purely exemplary. For example, in an actual FPGA more than one adjacent column of CLBs is typically included wherever the CLBs appear, to facilitate the efficient implementation of user logic, but the number of adjacent CLB columns varies with the overall size of the FPGA.

Figure 2:
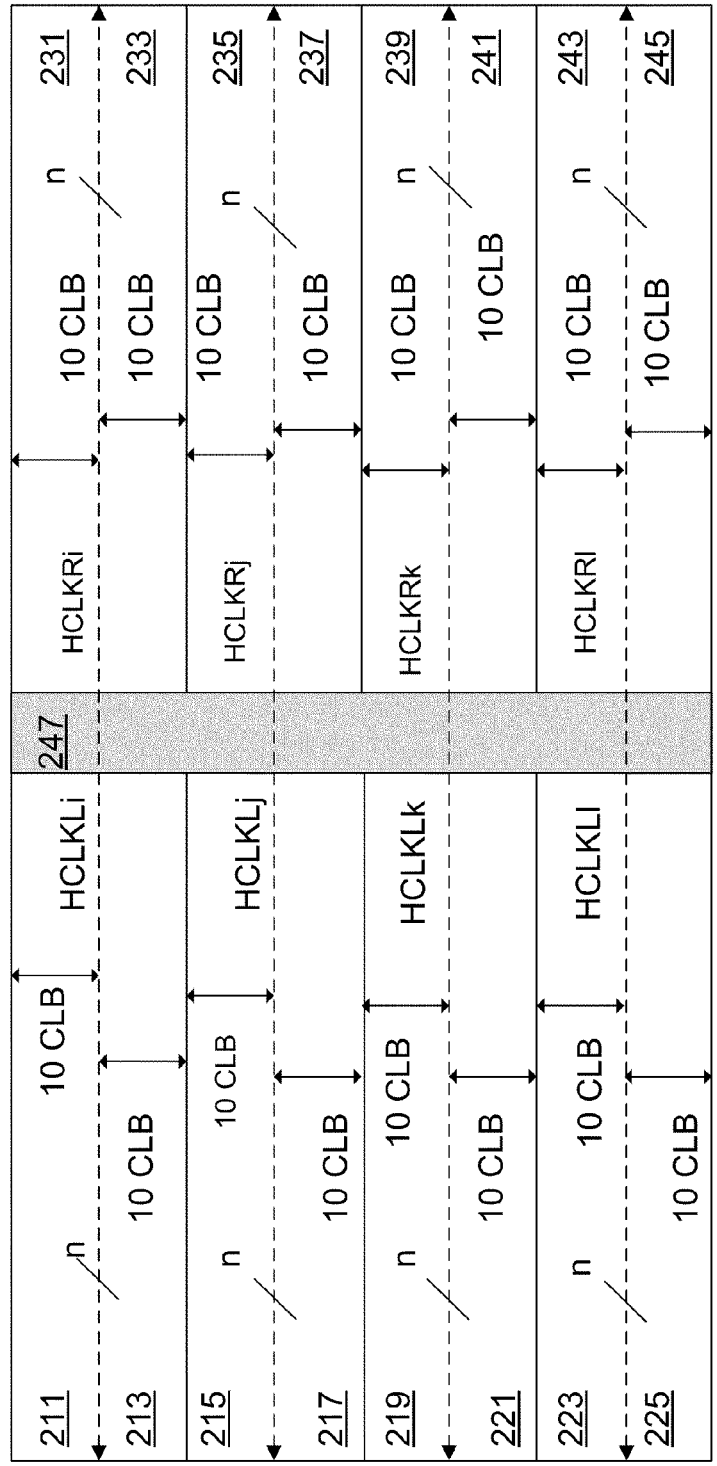
FIG. 2 depicts in a block diagram a portion of an FPGA having clock distribution networks.

FIG. 2 illustrates in a simplified block diagram a clock distribution portion 200 of an FPGA where one or more embodiments of the invention may be applied. In FIG. 2, vertical columnar region 247 contains clock drivers and clock busses for distributing clock signals. The portion 200 of the exemplary FPGA is also shown divided into left and right sides. For example, sections 211 and 213 form rows above and below the clock line(s) of width n labeled HCLKLi, or horizontal clock left 'l'; sections 231 and 233 form horizontal rows above and below the clock line(s) labeled HCLKRi, indicating horizontal clock line(s) right 'i'. Thus, for each horizontal clock line(s) i, j, k, l depicted in FIG. 2, there is a left side portion and a right side portion. Driver circuits within the columnar area 247, not shown in detail, drive clock signals onto each of these lines. Each horizontal section 211, 213, 215, 217, etc. to 245 is depicted as being 10 CLBs deep, that is, there are ten configuration logic blocks coupled to the horizontal clock lines along each section, arranged in a vertical column. The horizontal clock lines of width n may provide 1, 2, or any other number of clock lines per horizontal region. In one exemplary implementation, there are 12 lines (n=12) for each horizontal portion HCLK.

Note the uses of the descriptive terms "vertical" and "horizontal" in this description to distinguish portions of a clock distribution network in an integrated circuit. The use of these terms in this specification and the appended claims are recognized as arbitrary explanatory designations. If a completed device is turned in its orientation, these terms may of course be interchanged. That is, a device may have some portions of a clock distribution network that are arranged in one direction, some portions that are arranged in another direction, and these fall within the terms as meant in this description, irrespective of the positioning of the device. Further, alternative clocking structures that are hierarchical, such as a full tree arrangement of hierarchical elements, coupled hierarchy to hierarchy to hierarchy, or portions of networks such as sectional networks applied to the input output buffers ("IOBs") and separately, networks applied to the configurable logic blocks area or "fabric" are appropriate clock networks where one or more embodiments of the present invention may be advantageously applied. A clock hierarchy, as used in this specification, includes the buffers, and routing portions, that distribute the clock signals from a clock source to the synchronous elements that receive the clock signals; these buffers and routing portions are typically arranged in a symmetrical manner so that each clocked element receives the clock without significant skew with respect to the other clocked elements receiving the same or a related clock. Often the hierarchical clock distribution network includes levels of buffers that are provided in a tree starting with larger buffers driving relatively large routing lines running through a central portion of the design, and smaller buffers and routing lines coupled from those central portions and then smaller drivers forming local clock lines, and eventually proceeding through these drivers and routing portions until the local clock lines reach the clock inputs to synchronous elements.

Further, although in the illustrative examples depicted in the figures, the horizontal and vertical portions are drawn as perpendicular one to another for simplicity, these orientations are not necessary in all embodiments. Other arrangements are also contemplated as alternative embodiments that fall within the scope of the appended claims. As one non-limiting example, although the lines are labeled as horizontal and vertical in the illustrative explanatory circuit schematics presented here, in the physical placement on a semiconductor substrate, these lines may have any orientation with respect to each other, including parallel.

Figure 3:
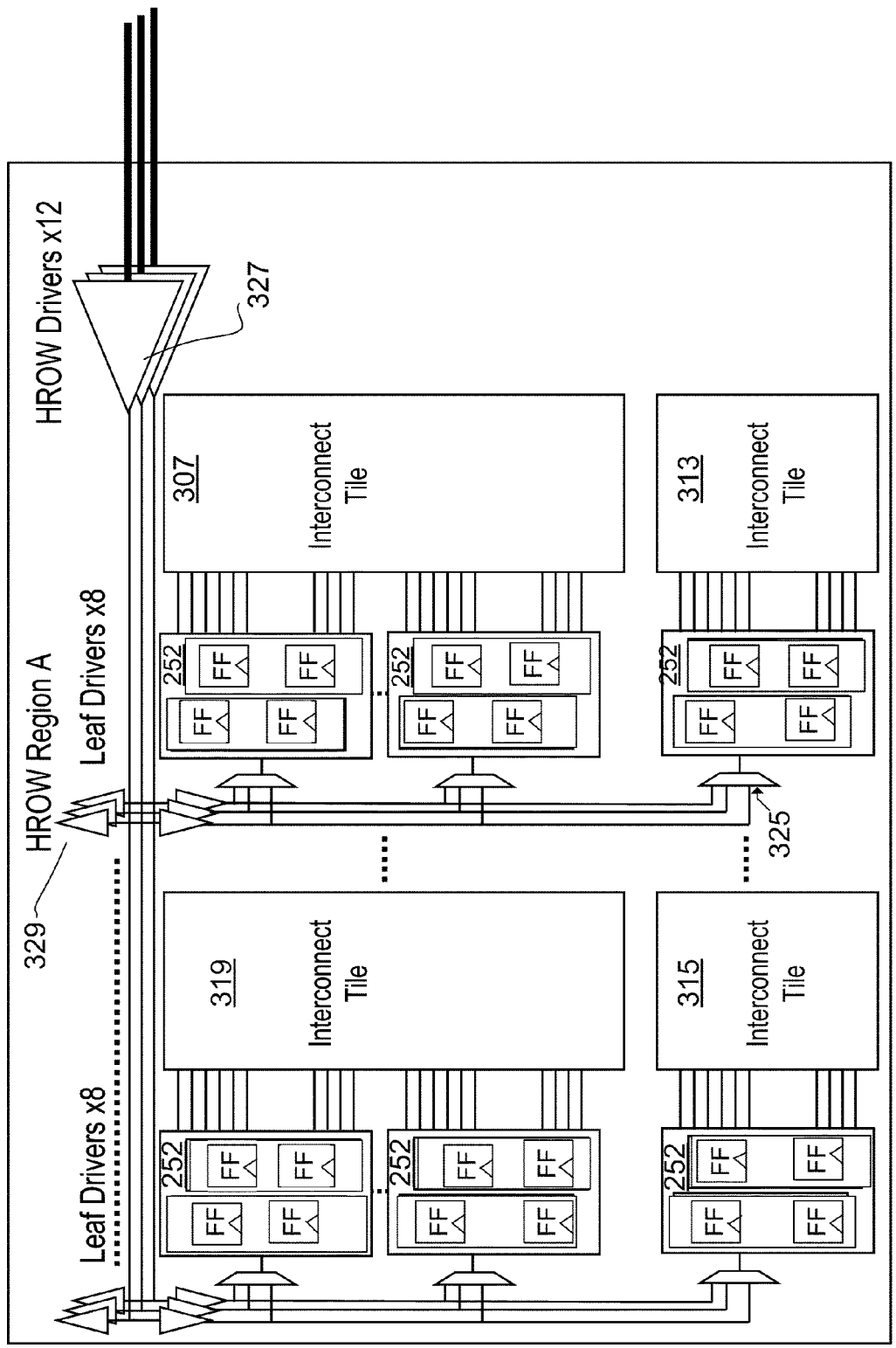
FIG. 3 depicts in a simple circuit schematic a portion of the clock distribution network for an FPGA.

FIG. 3 illustrates the clock signals in more detail for a portion of the exemplary FPGA embodiment. Here, region A 307 is depicted in an exemplary block diagram, further illustrating the distribution of clocking signals. In this detailed view, HROW drivers 327 are provided in 12 instances; more or less instances of the drivers could be used in an actual device. Each horizontal line driven by the HROW drivers is routed to leaf drivers 329 which are shown as x8 instances, so for each leaf there are 8 instances. Further, the HROW A portion shown in FIG. 3 has (n) clocking signals that are available for and routed to the CLBs. The multiplexers 325, each having "n" inputs, allow for selection for the clock to be used in a particular synchronous portion of a CLB. In the illustrative example shown in FIG. 3, there are 8 clock lines, and each multiplexer 325 would be an 8:1 multiplexer, many other arrangements are also contemplated as alternative embodiments.

The clock signal design criteria that must be met for the synchronous elements to work properly are the setup ($t_{su}$) and hold time ($t_h$) requirements. The minimum set up and hold times for the receiving register must be met by the output signal of the sourcing register. If the two registers were somehow clocked by rising and falling clock signals that were independent of one another, or by clock signals that had sufficient clock skew between them to violate these time requirements, proper operation could not be assured. The output of a register in such a case could transition in a manner that violates either a set up time requirement (input data to a register is held stable for a certain time period before a clock edge arrives) or the hold time requirement (input data to a register is maintained stable for a period of time after a clock edge arrives) of the destination register.

If the setup or hold time requirement of a synchronous element such as an edge triggered register is violated, metastable or "ringing" operation may occur on the register output. Conservative design of the clock distribution scheme using similar line sizes and driver strengths for example, which is confirmed by circuit simulation and layout verification steps, ensure that this timing violation does not occur. By maintaining common clock line sizes, line lengths, clock line loading, and clock driver sizes and also layout symmetry in the clocking scheme, such timing problems are usually avoided or eliminated.

A design to be implemented in an FPGA may be described as a netlist of functional or circuit elements, with connections described between them. These connections provide the signal paths coupling the elements needed to perform a specified function. The design netlist may be developed using a wide variety of known design approaches, including without limitation, schematic entry and population, automatic circuit synthesis and compilation, specifying functions using VHDL descriptions at a high level, or behavioral level, specifying functions at medium level using register transfer language (RTL), specifying functions at a lower level using gate level design language, and using libraries containing pre-defined macros or licensed IP cores that have such specifications already provided. Various formats for describing the design are available. Many vendors provide VHDL design and simulation platforms for entering and verifying an initial design. One netlist format commonly used in industry for circuit descriptions is "EDIF", the Electronic Design Interface Format. Other formats are sometimes used. As one nonlimiting example, the assignee of the present application, Xilinx Inc., provides a plurality of circuit design tools in a software environment designated ISE, or "Integrated Software Environment". ISE provides a suite of EDA tools for defining, simulating, verifying, compiling, and producing a top level netlist, which is then available for automated design implementation tools. The design implementation process prepares the netlist for implementation in an FPGA. EDA tools include analysis tools such as timing analysis, floorplanning and simulators for circuit verification. Reference is made to the documentation for the Xilinx ISE tools available at the internet url http://www.xilinx.com/itp/xilinx8/books/manuals.pdf.

Figure 4:
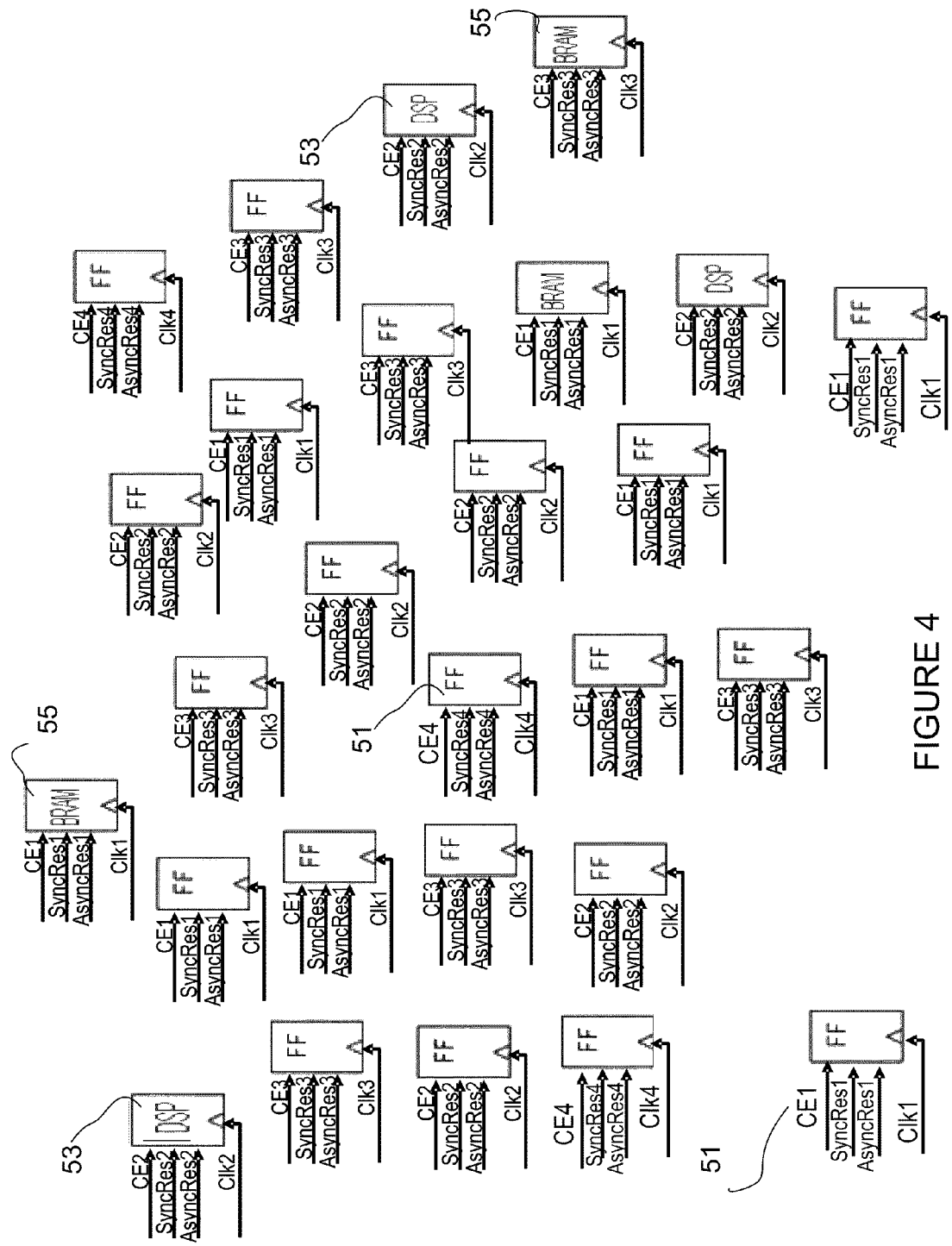
FIG. 4 depicts in a block diagram a plurality of synchronous elements with various clock signals and clock enable signals.

Each of the synchronous elements in a design netlist may typically receive several input signals. FIG. 4 depicts a plurality of synchronous elements which are flip flop registers (FFs) 51, digital signal processors (DSPs) 53 or block RAMs (BRAMs) 55, with the corresponding input signals shown. These elements are only illustrative examples; other synchronous elements used in a design may have fewer input signals. The data input signals coupled to the synchronous elements are not shown in FIG. 4 for simplicity, but are obviously also present. Each synchronous element necessarily is clocked by a clock signal Clki where i is 1-4. The clock signals may have some relationship (be synchronous) or may be independent one from another. A practical design could have far more, or fewer, clock signals.

Each of the synchronous elements typically has one or more reset signals. Because when the circuits in the FFs 51, DSPs 53, and BRAMs 55 are powered "on" from an "off" condition, the state is not known. It is necessary to reset them to a known state. Further, two types of reset are often used, as shown in FIG. 4. Asynchronous reset signals (AsyncRes in the figure) will force the registered elements to a known state, irrespective of the presence of a clock signal. Synchronous reset signals (SyncRes in the figure) will force the registered elements to a known state at the next occurrence of a clock signal.

The example synchronous elements of FIG. 4 further have clock enable inputs CEj where j is from 1-4. In this non limiting example, each clock signal Clki has a corresponding clock enable input CEj. There are thus four different CE signals shown designated as CE1-CE4 shown in FIG. 4, although a practical circuit netlist may have many more, or fewer. The clock enable signals are used to conserve dynamic power during circuit operation by disabling the switching within certain synchronous elements at times when the synchronous elements are not needed. At other times, the clock enable signals allow the synchronous elements to be clocked, and of course to consume dynamic power. Note that the clock enable signals may be asynchronous. For example, the clock enable signals may be sourced from an off chip control signal; or from logic within the FPGA that is clocked on another clocking regime. The timing of the clock enable signals may be synchronous, or asynchronous, to the clock signal at the synchronous element and the embodiments of the present invention contemplate both arrangements.

As shown in FIG. 4, the synchronous elements may be clocked with any one of the available clocks, and the synchronous elements may be enabled with one of the corresponding clock enable inputs; in the initial design netlist, the synchronous elements may be described functionally with no particular pattern or grouping.

As is well-known to those skilled in the art, clock-enable, synchronous reset, and asynchronous reset signals can be added to simple registered devices in a design. A multiplexer in the user logic implemented on the FPGA may select the input signal to the synchronous element in response to one or more control signals. The control signals that controls the input to the synchronous element may be treated as a clock enable signal. Thus, even though the synchronous element specified in the netlist does not have an explicit clock enable input pin, or alternatively does not have explicit synchronous reset or asynchronous reset pins, the existence of the those signals may be inferred from the circuitry connected to that synchronous element (the simple register). One of ordinary skill in the art will recognize that in such a case, the corresponding control signals and input signals may be treated identically with the explicit clock enable and synchronous reset signals described above herein. In other words, these arrangements are also candidates for the conversion to a gated clock signal, replacing the clock enable signal.

In FIG. 5, the results of an exemplary method of the invention are shown in a tabular form. The design netlist is scanned or otherwise examined, and the synchronous elements are identified that may be grouped by their common input clock and corresponding common clock enable signals. Each clock signal and control signal, along with the reset signals, may be categorized and elements with common input signals may be associated with a set designated as a "control set". Each row of the table then illustrates a set of elements that are coupled to common control and clock signals. In FIG. 5, the control sets for the synchronous elements of FIG. 4 are shown; control sets 1, 2, 3, and 4 correspond to elements clocked with Clk1-Clk4 and enabled with the corresponding clock enables CE1-CE4.

Figure 6:
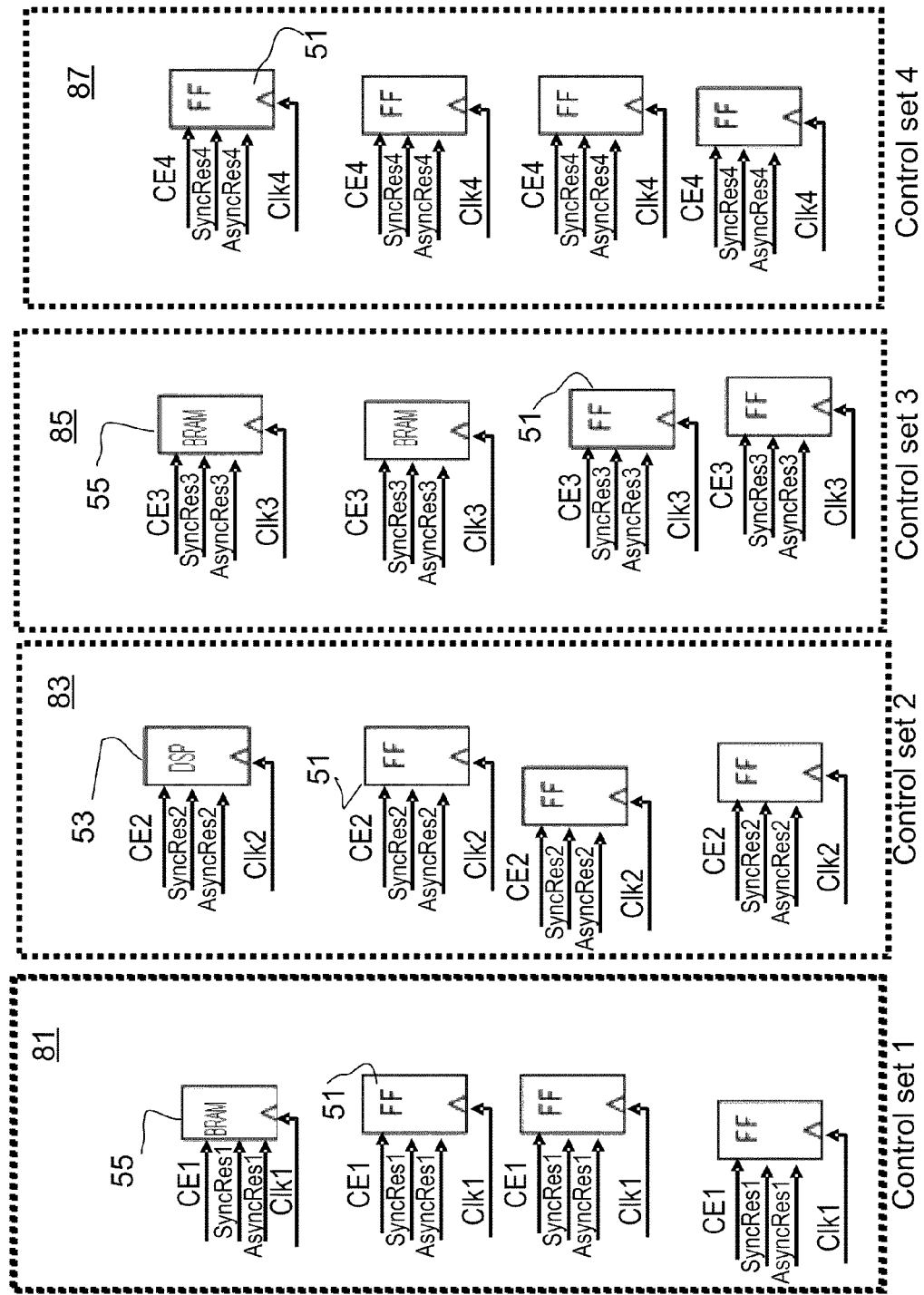
FIG. 6 depicts in a block diagram the synchronous elements of each of the four sets presented in the table of FIG. 5.

FIG. 6 depicts in a simple block diagram the synchronous elements of FIG. 4, now arranged in groups according to the control sets 1-4. Block 81 contains the elements of control set 1, in the example. Block 83 contains the elements of control set 2; similarly blocks 85 and 87 contain the elements of controls sets 3 and 4.

Figure 7:
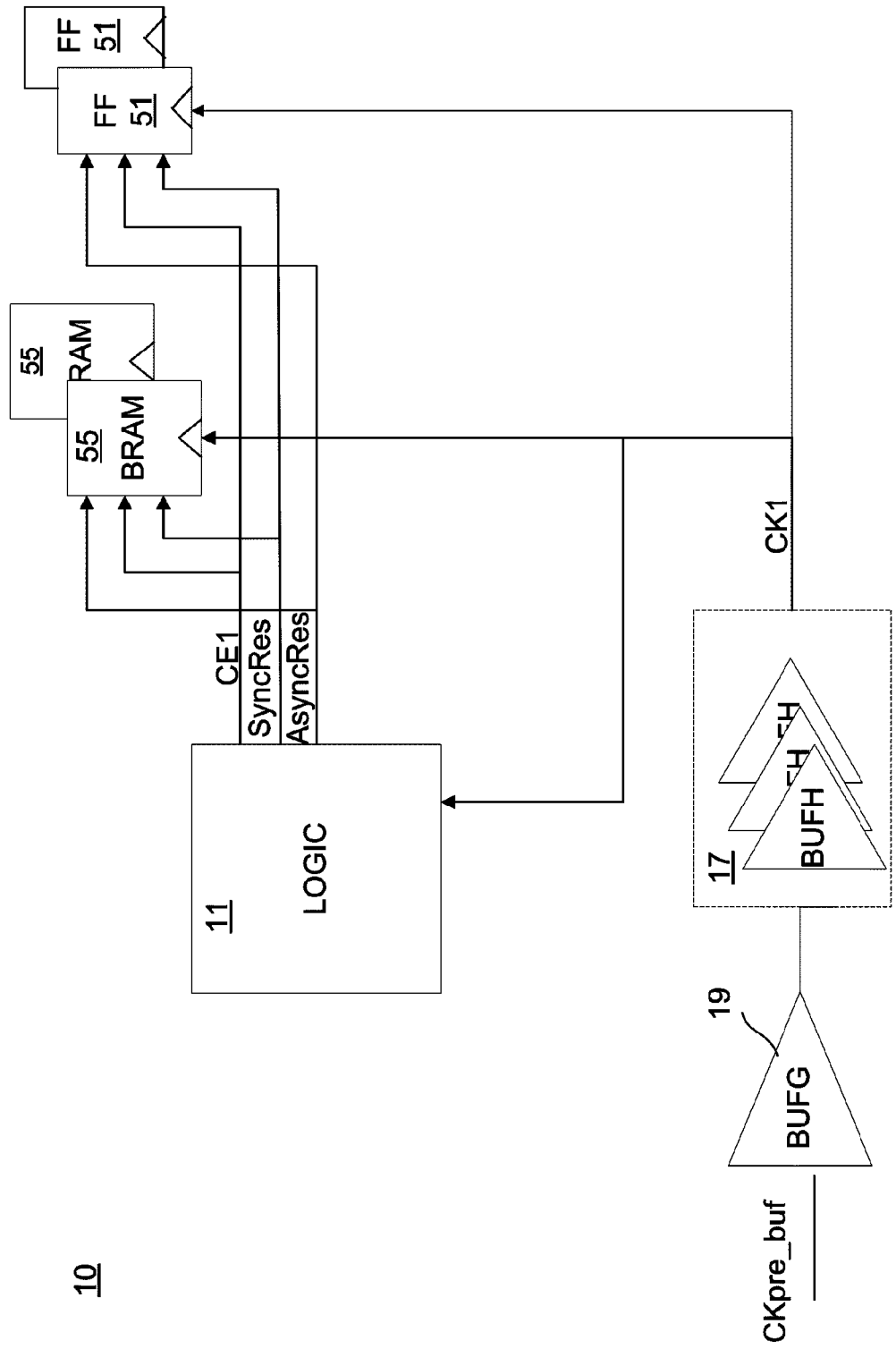
FIG. 7 depicts in a circuit diagram one of the sets of synchronous elements of FIG. 4 with clock and clock enable signals as arranged prior to the application of embodiment methods of the invention.

FIG. 7 depicts, as a non limiting example, an example circuit schematic of the first control set in circuit portion 10. Input signal CK is buffered first by a buffer 19, a type of clock buffer BUFG which is available as a clock buffer resource in an FPGA. Additional fan-out and drive capability is provided by buffers 17 which are shown as a second type BUFH. The buffers in the clock hierarchy are typically provided by the EDA tools used to design the circuitry and map it onto the resources available within the FPGA, and the designer typically is unaware of these buffers. That is, the EDA tools perform steps to determine the drive needed on the clock lines, and these buffers are then inserted in appropriate places in the netlist to provide efficient fan-out and routing of the clock signals. The local clock signal for the circuit 10 is then labeled CK1. Clock signal CK1 is routed to a combinatorial logic block 11. Outputs of the logic block include a synchronous reset signal SyncRes, an asynchronous reset signal AsyncRes, and a clock enable signal CE1. Each of these signals is routed to some synchronous elements. BRAM blocks 55 are shown being clocked by the clock signal CK1 and are being enabled by the clock enable signal CE1. Similarly, the flip flops FFs 51 receive these same signals.

In FIG. 7 only a few synchronous elements are shown. In a practical implementation, many more synchronous elements may be coupled to a particular clock enable signal and the corresponding clock signal. When considering the drive strength needed and the routing area needed to provide the clock enable signal CE1 and the clock signal CK1 to many loads, the use of the two signals as inputs to synchronous elements clearly requires many resources. Additional power is consumed to drive a heavily loaded clock enable signal.

Figure 8:
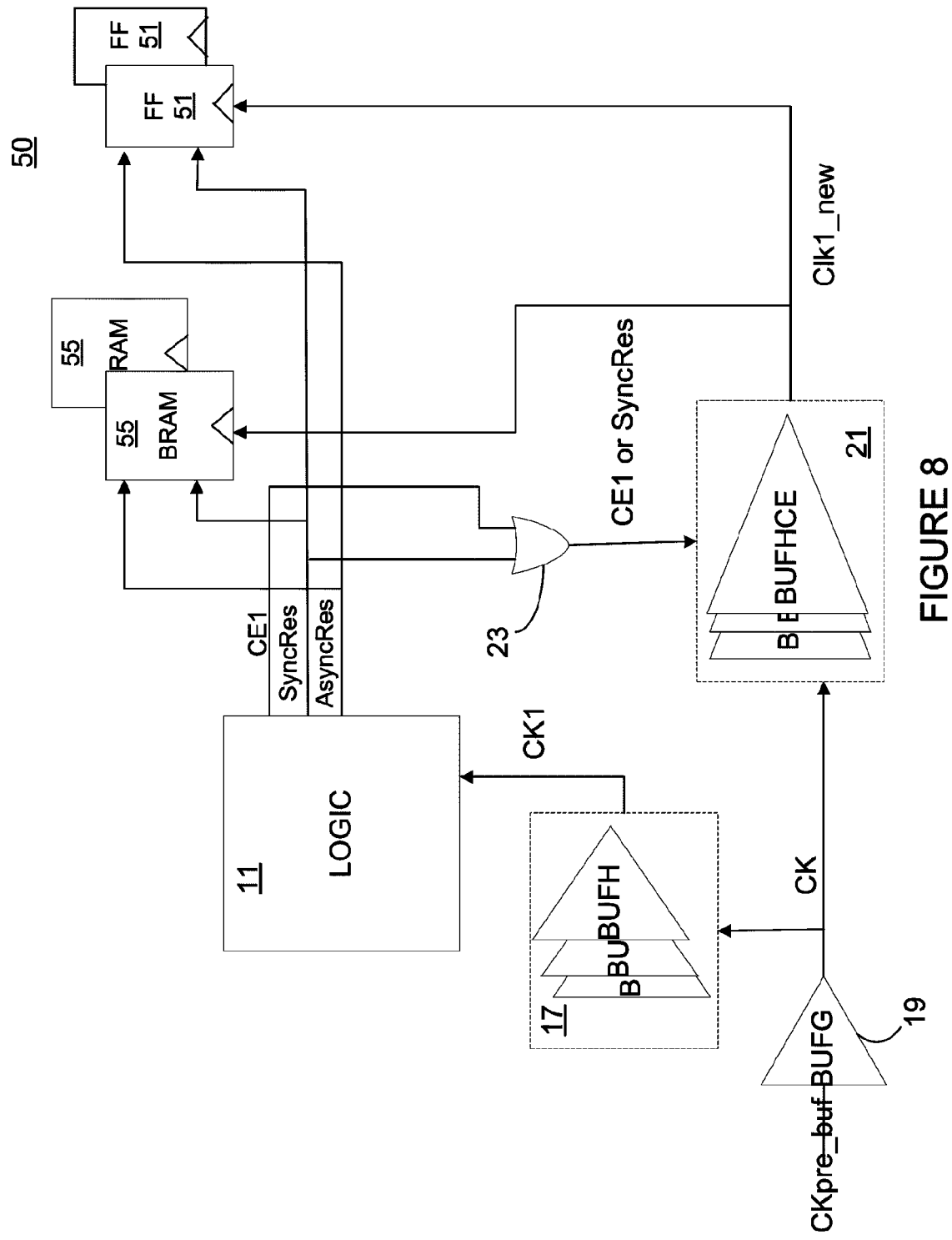
FIG. 8 depicts in a circuit diagram the circuit of FIG. 7 after the application of a method embodiment.

FIG. 8 depicts a modified circuit schematic 50 for the first control set obtained after an exemplary method of the invention is performed. In FIG. 8, the synchronous elements 51 and 55 that were in control set 1, identified by 81 in FIG. 6, no longer receive the clock enable signal CE1. These elements are also no longer clocked by the local buffered clock CK1. A new clock signal Clk1_new is shown clocking the synchronous elements, BRAMs 55 and FFs 51. A new set of buffers 21 with clock enable inputs, labeled BUFHCE, are provided to drive the new clock signal, which is a gated clock signal. These buffers receive as an input signal the local clock signal CK, and as a control input signal the output of logical OR gate 23, "CE1 or SyncRes". It should be noted that other elements 51 and 55, which are not part of 81 in FIG. 6, can continue to have the non-gated clock, and the appropriate CE, still connected.

In operation, the clock signal Clk1_new will clock the synchronous elements 51 and 55 in FIG. 8 when the clock enable signal CE1 is active. Alternatively, the buffers 21 will also provide a clock signal on the Clk1_new signal when the SyncRes is active. This is necessary because if the BUFHCE buffers 21 did not pass the clock signal during a synchronous reset, the registers would not be forced to a known state. The OR gate 23 may be used to ensure that the synchronous reset process is completed correctly. Other arrangements to ensure the clock is present during a synchronous reset could also be used and are contemplated as alternative embodiments. It should be noted that the OR gate 23 is only necessary if the control set contains a SyncReset. If the control set only has a CE, then the OR gate 23 is eliminated and the signal CE1 goes directly to CE pins of the BUFHCEs in block 21 of FIG. 8.

The use of the new gated clock buffers 21 allows the routing of the CE1 signal to be removed from the synchronous elements. These routing channels are then freed for other signals, thereby increasing available resources. Although only four synchronous elements are depicted in this explanatory example, many more might be coupled to a clock enable line in a practical netlist. By removing the clock enable lines, in addition to routing signals saved, buffers for driving the CE lines can be saved, and additional power saved. These buffers, a limited resource on an FPGA device, are then also available for other signals.

Figure 9:
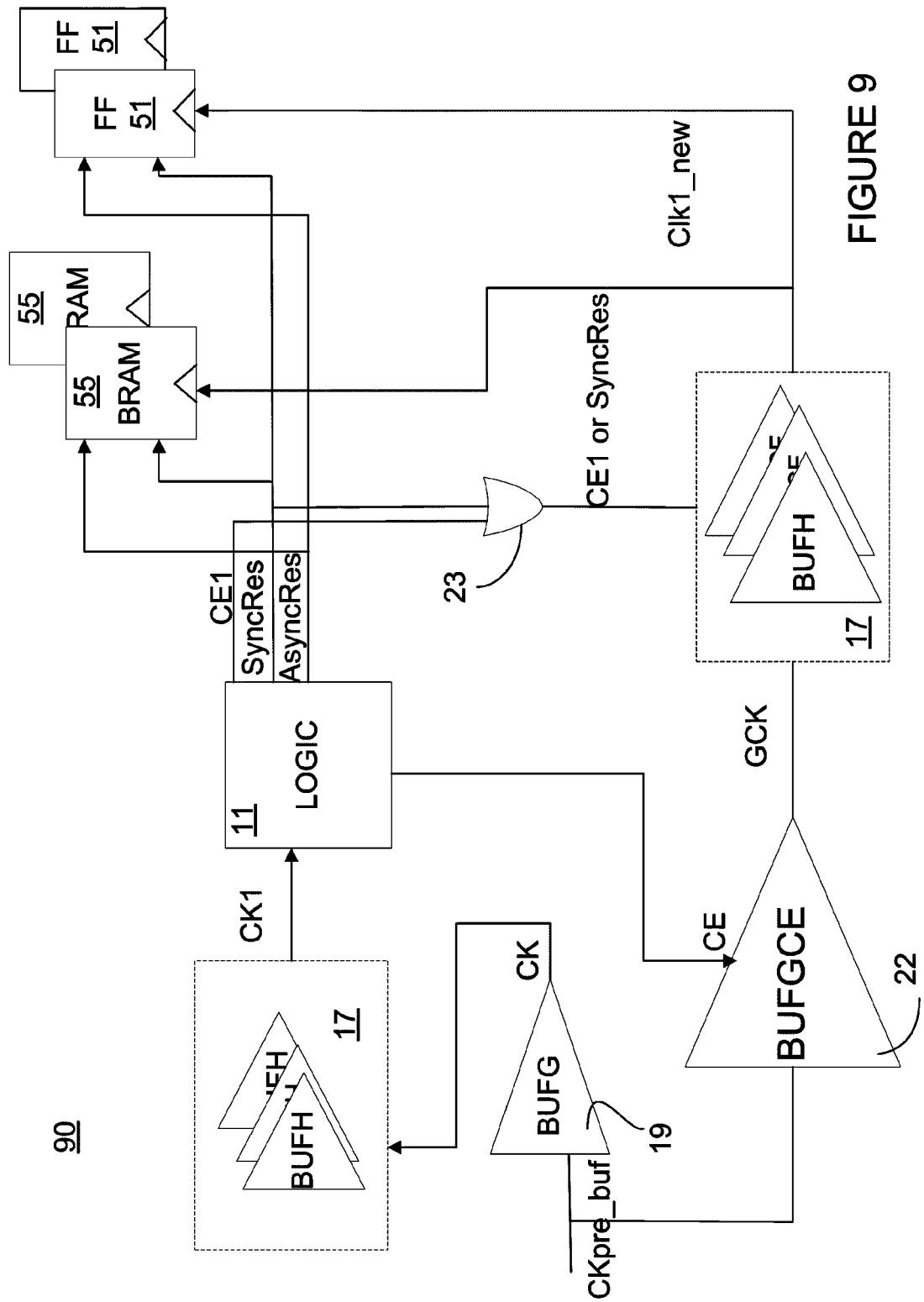
FIG. 9 depicts in a circuit diagram the circuit of FIG. 7 after the application of an alternate method embodiment.

FIG. 9 illustrates in another simple circuit schematic 90 an alternative circuit obtained after performing another exemplary method of the invention. In FIG. 9, the circuit of FIG. 7 is again modified, although the gated clock is now provided in a slightly different manner. In FIG. 9, buffer 22 is added in parallel to the BUFG buffer 19, and is a type BUFGCE. This gated clock buffer receives the pre buffer clock input signal as its input, and a control signal CE. Again logical OR gate 23 provides the control signal. The output signal GCK is active when the CE1 clock enable signal is active or when the synchronous reset signal SyncRes is active. Buffers 17 which are type BUFH are inserted and do not receive a chip enable signal, instead they drive the gated clock output by the buffer BUFGCE, GCK, onto the Clk1_new signal. It should be noted that the OR gate 23 is only necessary if the control set contains a SyncReset. If the control set only has a CE, then the OR gate 23 is eliminated and the signal CE1 goes directly to CE pin of the BUFGCE in block 22 of FIG. 9.

In operation, the gated clock signal Clk1_new in FIGS. 8 and 9, is functionally the same and the registers FFs 51 and BRAMs 55 will be clocked in the same manner for both of these alternative embodiments. The particular method approach used to add the gated clock buffers depends on the types and numbers of buffers available to the design tools. One or more method embodiments of the invention contemplate scanning a design netlist, identifying potential clock enable conversion candidates, determining available resources (gated clock buffers), and using typical cost functions, replacing the clock enable and clock signals to synchronous elements in the control sets with a gated clock signal when it will save power and resources to do so.

The method embodiments of the invention may be performed, e.g., by EDA tools used to implement an FPGA from a design netlist. After a design netlist that is independent of circuit resources is developed, a process is performed to implement the design in an FPGA programming file such as a bitfile or bitstream. This implementation process has as inputs the technology independent design netlist, timing, area, power or other design constraints, and the resources available for implementing the design. The implementation process may include files provided by the FPGA manufacturer that make the number of routing channels, CLBs, CLEs, BRAMs, DSPs etc and their physical locations available to the design implementation process.

Figure 10:
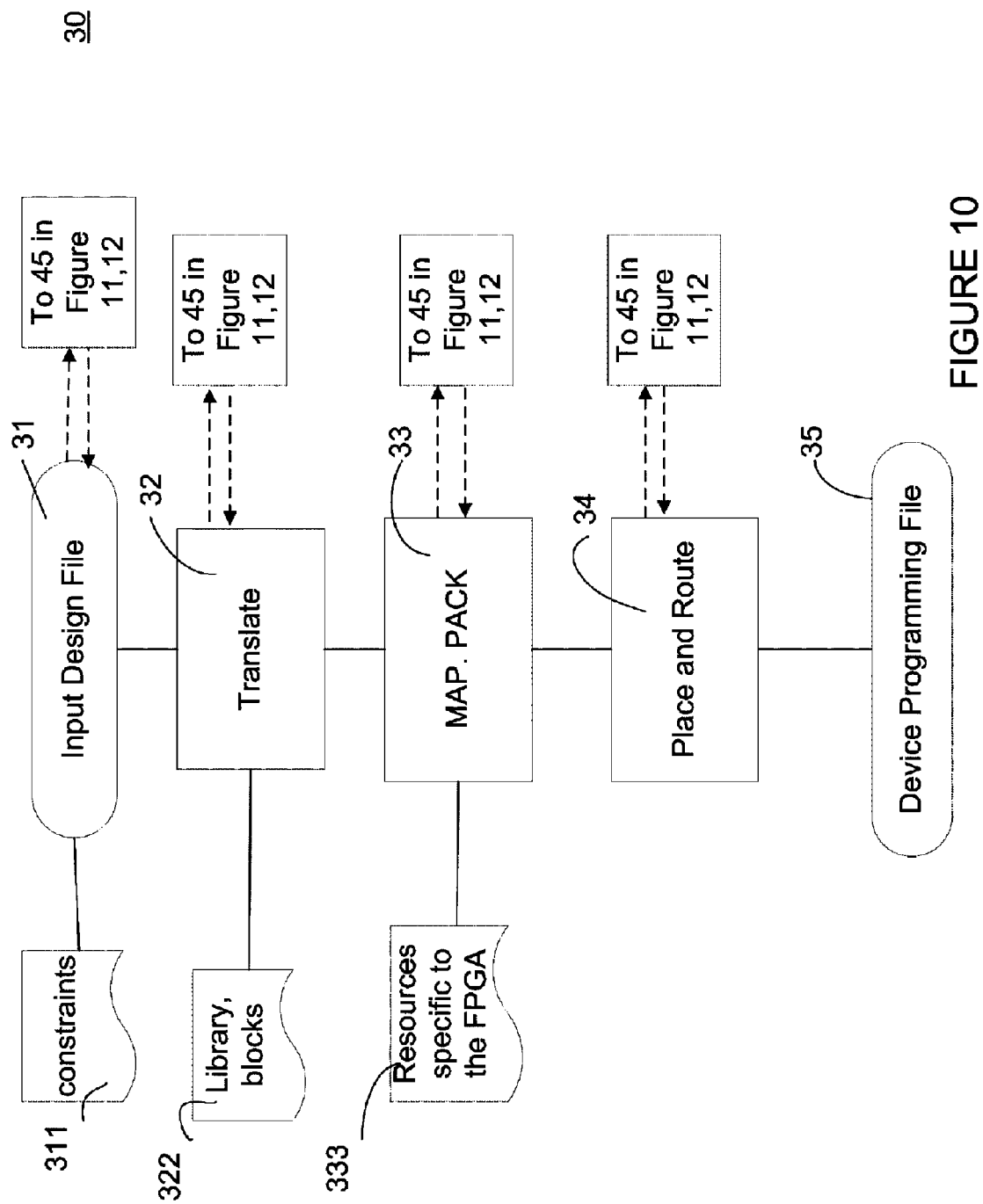
FIG. 10 depicts in a flow diagram the major process steps used to implement a design netlist in an FPGA.

FIG. 10 depicts in a flow diagram the steps performed by a design implementation process 30 where method embodiments of the invention may be utilized. In step 31, a netlist description of the proposed design, such as an EDIF file, is received as an input. In addition, design constraints 311 such as timing constraints, area constraints and the like may be provided.

In step 32, the netlist is translated. The translate tool may perform a step where logic blocks and synchronous functions are translated into the technology dependent netlist which lists as instances the types of blocks available in the particular FPGA or CPLD that is to implement the design. The translate tool may receive the library or block parameters 322 for a particular technology or FPGA family as input.

After the translate step produces a second, technology dependent netlist, a mapping and packing function 33 is performed. The map function receives as an input the particular resources 333 available in terms of the types and numbers of DSPs, CLEs, CLBs, FFs, BRAMs, etc. for the FPGA to be used. The map function will perform a matching function and assign resources in the FPGA to blocks in the translated netlist.

A packing operation may also be performed with the mapping step 33. In packing, the netlist is processed and logical resources are assigned in an efficient manner, available resources in a particular block are used up before another block is assigned to a function, for example, to make sure no resources are inefficiently used.

After the mapping function completes, a place and route (PAR) step 34 is performed. This step will provide the connectivity information, input output pin assignments, and particular blocks will be assigned to complete a physical implementation of the netlist provided by the map tool. Since an FPGA, unlike an ASIC or custom device, has already been physically routed and only the interconnections are available for change, the place and route tool does not have to actually perform the routing of the conductors, but instead must assign existing conductors and interconnections to implement the design netlist.

After the place and route is performed, in step 35 a programming file, often referred to as a "bitfile" or "bitstream" is created that may actually program the interconnect tiles, the memory devices, the logic blocks, and the connectivity of the FPGA using a device programming tool to make the connections. This file then enables the circuit to be physically implemented on a particular FPGA.

One or more embodiments of the present invention may perform additional method steps. These method steps may modify the netlist to convert certain clock enable and clock signals to gated clock signals. The additional method steps are entered in step 45 in FIG. 11 or 12, described below. These steps may be performed at any stage in the design flow as depicted in FIG. 10. For example the additional steps may be performed after the design netlist is received in step 31, after the translate step 32, after the map and/or pack step 33, and after the place and route step 34. Preferably the additional method steps are performed in the process before place and route because the resources available in the design and choices about routing and placement have already been made, and the ability to modify the design may be limited by these steps. After the embodiment method steps are performed as described in detail below, the design flow returns and continues with the modified netlist.

Figure 11:
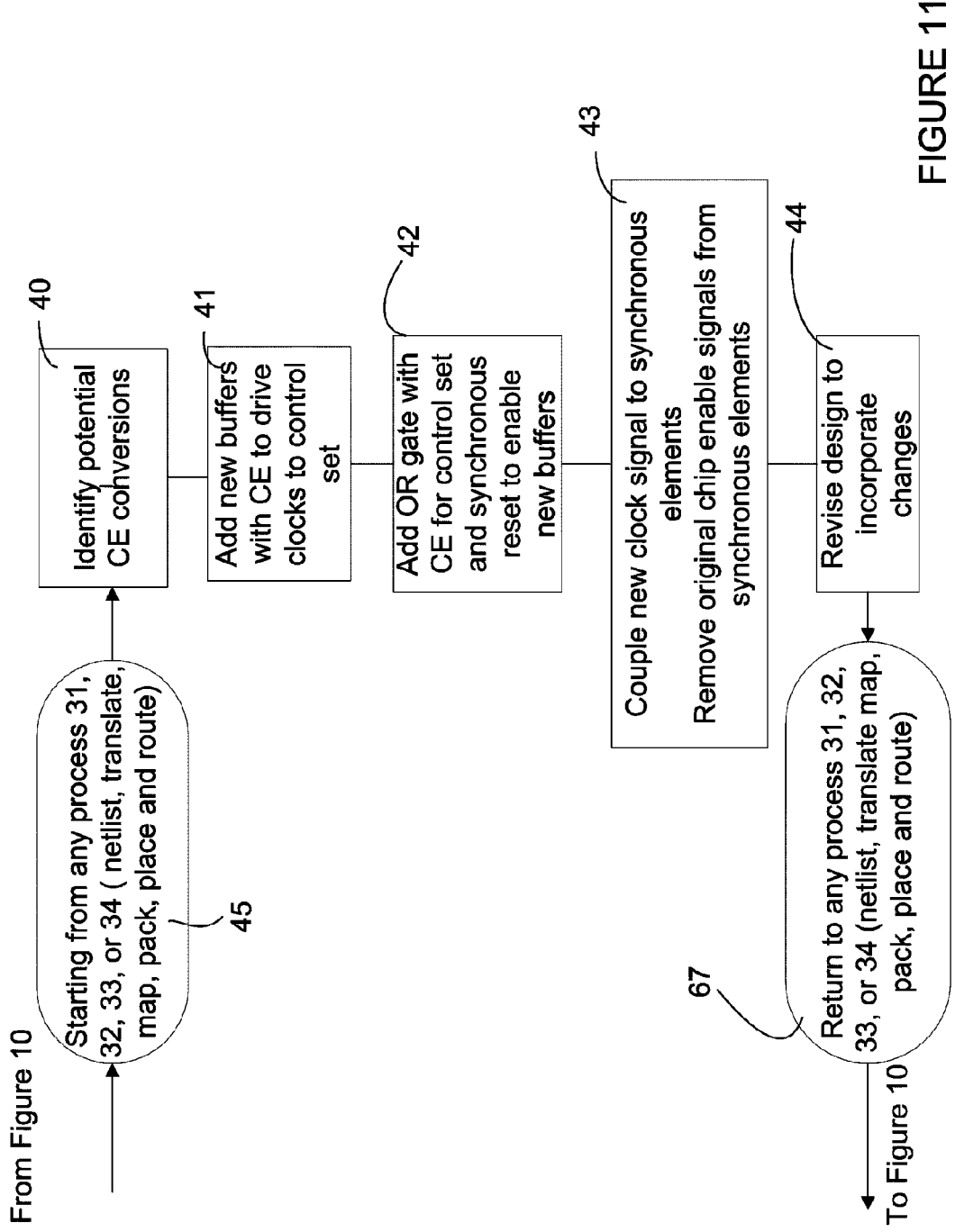
FIG. 11 depicts in a flow diagram an exemplary method embodiment.

FIG. 11 depicts in a flow diagram an exemplary embodiment method of the invention that may be performed during a new additional process. In FIG. 11, at step 45 the design is provided from FIG. 10 at any one of the steps 31, 32, 33, or 34.

In step 40, the potential CE conversions are identified in the design. As described above, control sets are grouped by common clock signal and common clock enable signals. After the control sets are grouped for each control set, the available gated clock buffer resources are identified. In step 41, the clock signal in the original netlist is cut, and the clock signal is replaced with a new clock signal which is driven by new gated clock buffers.

In step 42, the source of the clock enable signal and the synchronous reset signal to the control set is located and circuitry for providing the logical OR is added.

In step 43, the new gated clock buffer(s) created in steps 41, 42 are connected to the synchronous elements in the control set. In addition, the clock enable signals to the synchronous elements in the control set are removed. The design is then revised and a modified netlist is obtained in step 44.

In step 67 the design process returns to the appropriate process in FIG. 10. If the netlist is ready, the process may return to a later step than the process (31, 32, 33, and 34) step that entered step 45 at the top of FIG. 10. For example, if the modified netlist is produced using the steps 41, 42, 43, 44 after the translate step 32, the process may continue in step 33 in FIG. 10. Alternatively the process could return to step 32 again.

Recall from FIGS. 8 and 9 that the gated clock buffers may be provided at any level in the clock hierarchy. As the control sets are identified, logical groupings may be performed to further conserve routing signals and resources. Logical relationships between clock and clock enable signals may be exploited.

As a non limiting example, if in a particular case a clock enable signal is a subset of another enable signal, logical combinations may be made. For example, if a pair of flip flops FF1 and FF2 are identified in a design, each clocked on the same clock signal, and the clock enable signals CE1 and CE2 are related as CE2=CE1\*b, then clearly the clock signal and CE1 can be replaced with a gated clock signal and the control set containing FF1 can be converted. However, FF2 must still have a clock enable signal 'b', although it can be clocked with the same gated clock signal as FF1.

PLDs, including FPGAs or CPLDs, have limited numbers of resources available. This is in contrast to a semicustom or ASIC design flow, where the number of buffers and logical circuits is increased to implement the netlist. The steps of mapping, packing, place and route in the PLD design tools takes into account the available resources.

Converting clock and clock enable lines to a gated clock buffer may be done, in accordance with additional exemplary method embodiments of the present invention, in a prioritized way so that the best conversions are done first (the ones that save the most power and use the resources efficiently). Put another way, cost functions may be used to identify the most promising clock enable conversion candidates in the methods of the invention.

Figure 12:
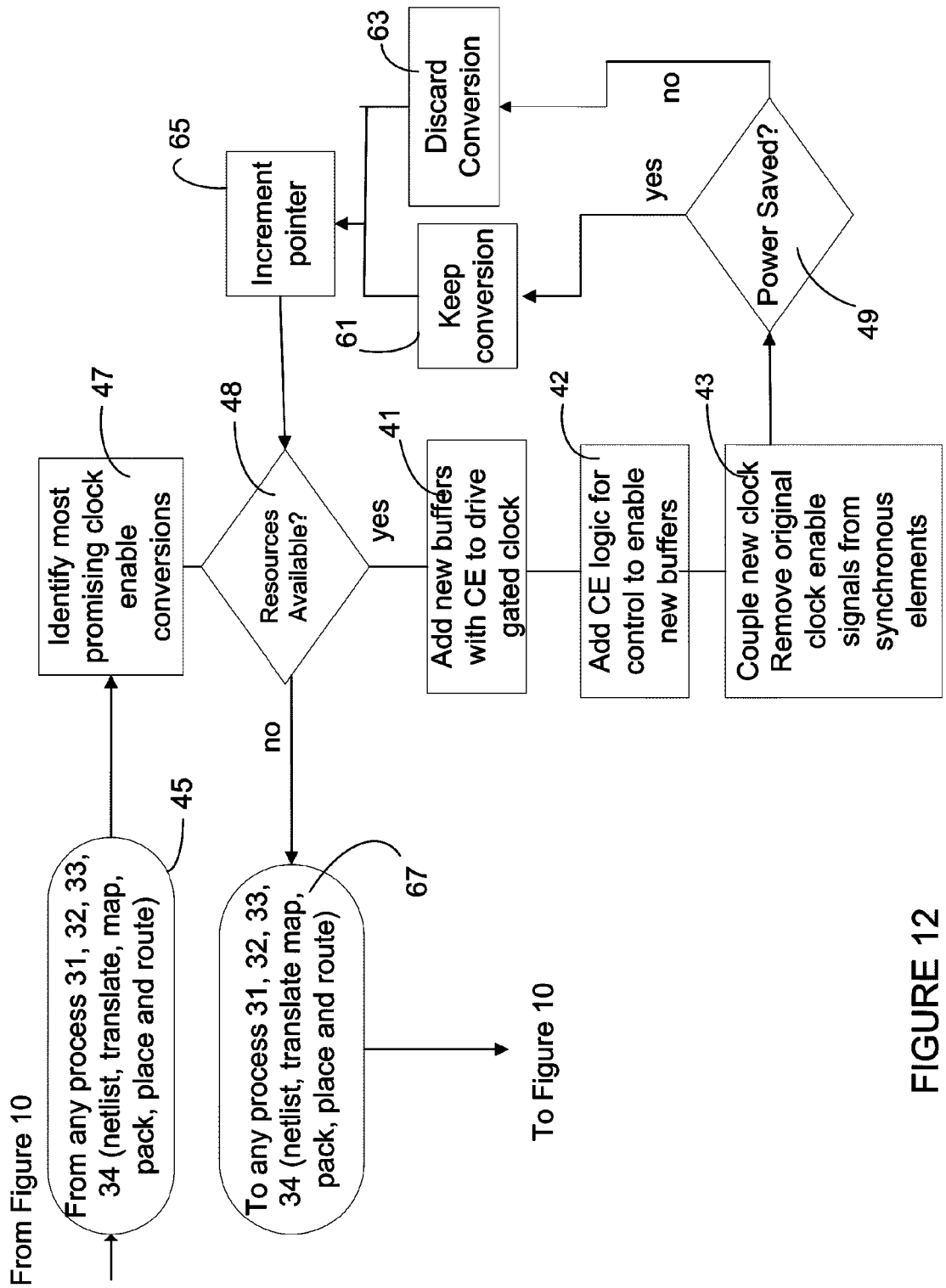
FIG. 12 depicts in a flow diagram an alternative exemplary method embodiment.

FIG. 12 presents in a flow diagram, an alternative embodiment approach. In FIG. 12, the entry point is again labeled step 45 and begins from any one of the process steps in FIG. 10. Step 47 begins with a design after any of these steps, for example after design netlist 31, after translate step 32, after map and pack step 33, or after placement and route in step 34. Preferably the method of FIG. 12 begins with the netlist prior to placement and route, so that more flexibility and freedom of choice is available. In step 47 the process forms a list of potential clock enable conversion candidates and a cost function is applied to identify the most promising candidates.

In step 48, a loop process begins. The loop begins by determining if gated clock resources (gated clock buffers such as BUFGCE or BUFHCE, for example, used above) are still available. If they are, then in step 41, the same step as in FIG. 11, the clock signal for a particular CE candidate is cut and the process performs a buffer insertion to insert the gated clock buffer at a convenient place in the clock network. In step 42, the same as in FIG. 11, the process adds any circuitry needed to provide the clock enable signal (including the synchronous reset, for example) to the new gated clock buffer. In step 43, the same as in FIG. 11, the process routes the new clock to the synchronous elements, and removes the clock enable lines from the circuit.

In step 49, a power savings analysis tool is then used to determine if the power savings is above a certain threshold. This could also account for the added buffers, routing changes, etc. needed to perform the clock enable conversion. If the power savings is not above the threshold, the process transitions to step 63, where the conversion is discarded, the original information is restored in the netlist, and in step 65, the process continues. If in contrast a power savings above a threshold is achieved, the place and route netlist is updated at step 61, and the process continues at step 65. This process may continue in a loop wise fashion until the available gated clock buffers are fully utilized, or as an alternative, until another limit such as a count is reached. Once the resources available are used, the process ends at step 67 and the design process continues in the appropriate process step of FIG. 10.

Additional method steps of the embodiments recognize that not every potentially identified CE conversion opportunity in a netlist will prove to be advantageous. The resources available for conversions on a given FPGA are also limited, so some cost function analysis may be performed to identify the most promising candidate clock and clock enable signals for conversion.

Because the clock routing in the FPGA has certain characteristics some conversion candidates will be more beneficial. For example, synchronous elements arranged in a single column may provide a good benefit, while elements dispersed widely will not provide the same benefit. Clock enable signals that are heavily loaded will provide good candidates for conversion. Lightly loaded clock enable signals will not. Elements in a single CLB or group of closely spaced CLBs can provide a good opportunity for conversion. Cases where only a few synchronous elements receive a clock enable signal will be less promising, in terms of power savings and routing savings, than cases where the clock enable line is heavily loaded.

The timing characteristics of the clock enable line are also important. If a clock enable is almost always disabled, this might provide more benefit after conversion than a clock enable signal that is almost always enabled. A clock with a rapid frequency and a clock enable signal is a more promising candidate than a lower frequency clock signal as the dynamic power savings available is greater.

Figure 13:
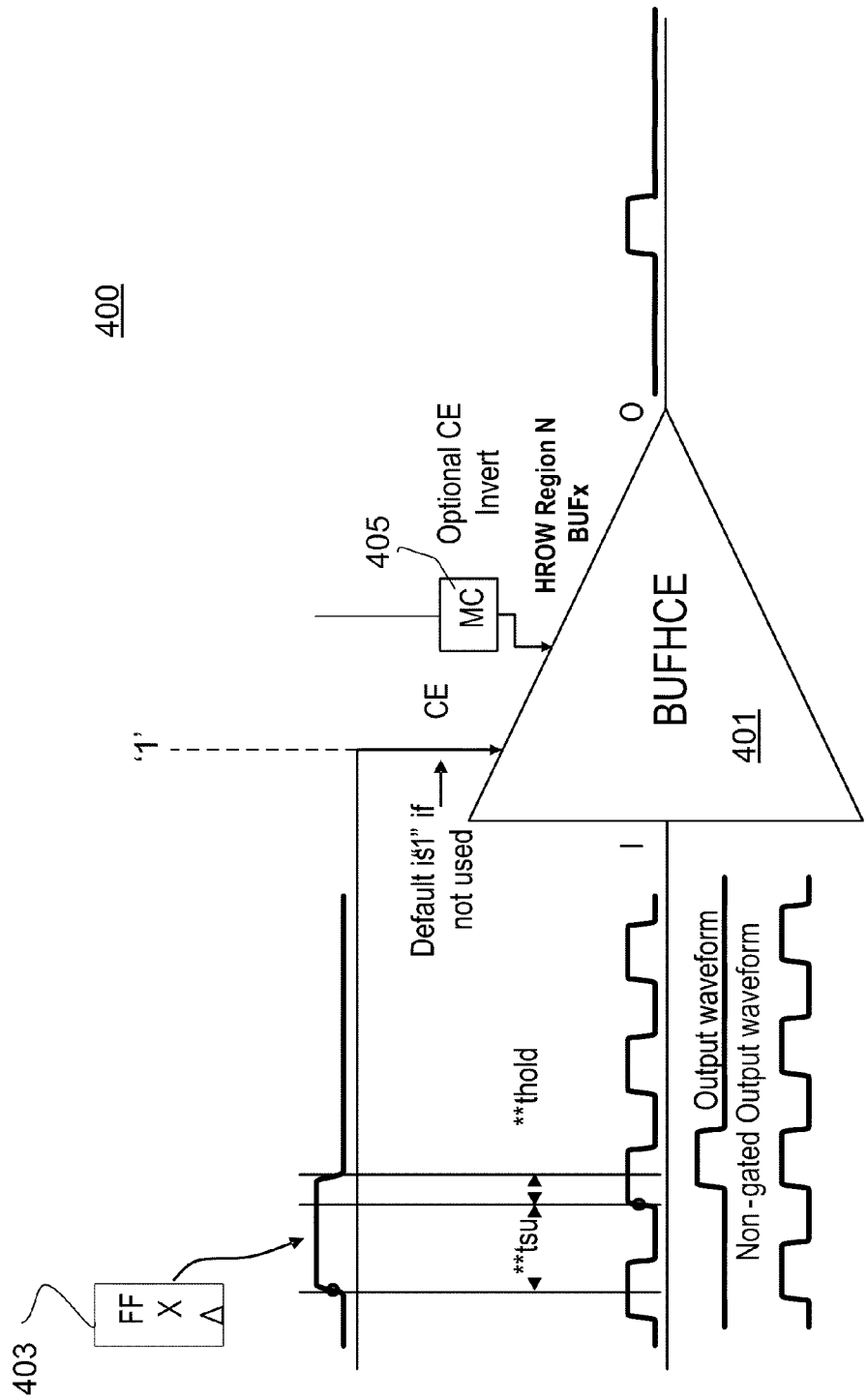
FIG. 13 depicts a clock buffer with a gated clock output for use with the methods of the invention.

FIG. 13 depicts in a simple block diagram the operation of a gated clock buffer 400. The clock enable signal must be provided from a source, such as register 403, that will meet the set up and hold time requirements for the clock buffer as shown in the timing diagram. The output waveform is shown for a typical 50% duty cycle clock input. When the signal is gated, a single clock pulse is output responsive to a single clock cycle active clock enable. When the signal is not gated (clock enable is tied high or not used) buffer 401 outputs a slightly delayed clock waveform. At the output side of buffer 401, a gated clock is shown. Inverter 405 may be used to change the polarity of the clock enable signal.

Figure 14:
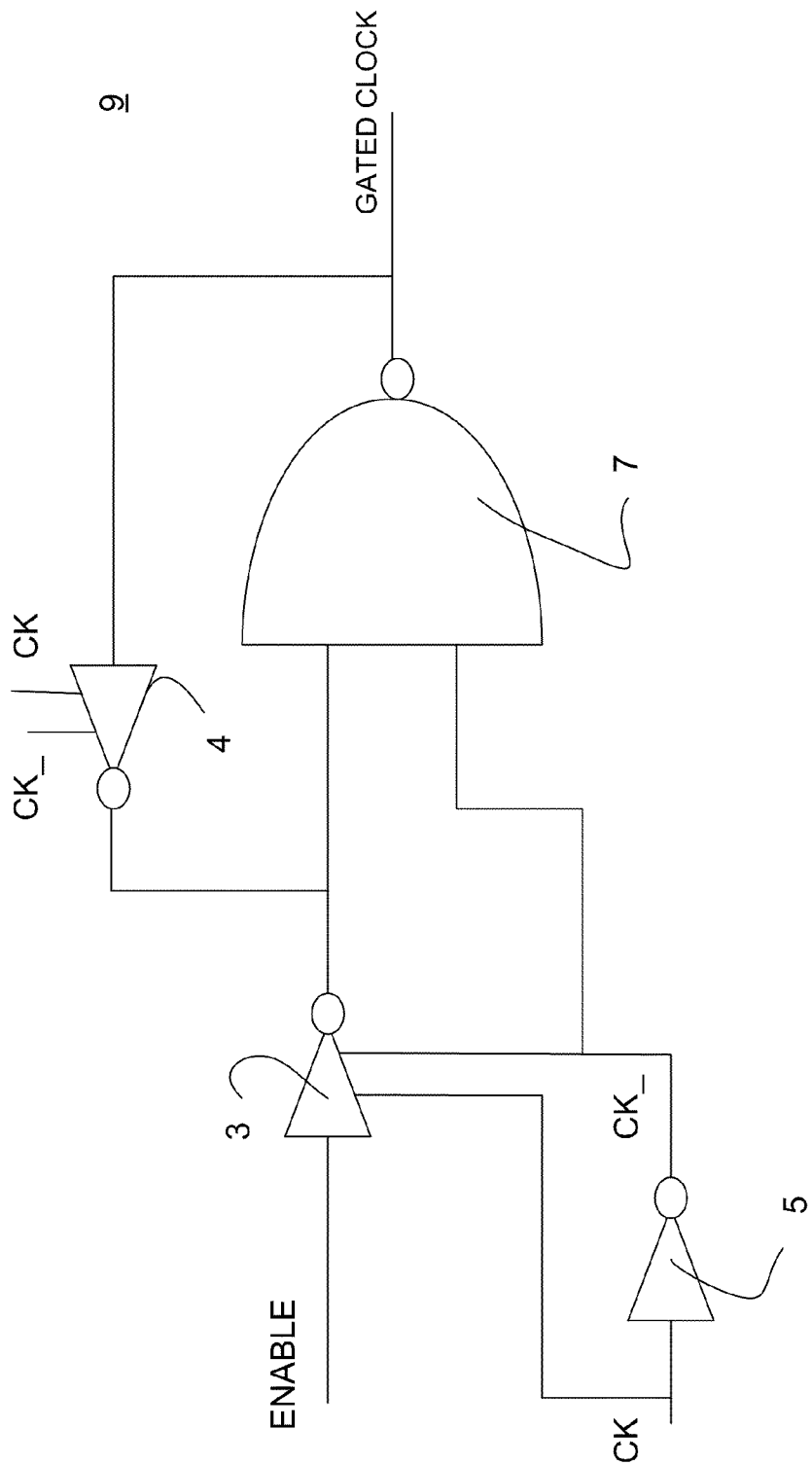
FIG. 14 depicts in a circuit schematic a clock gating circuit of the prior art which may be used with one or more embodiments of the invention.

As is known in the art, clock gating circuitry should be provided in a manner that meets or exceeds the original clock high and low times on the clock signal. FIG. 14 is a prior art circuit for providing a reliable gated clock output responsive to a clock input and an enable signal, and is described fully in U.S. Pat. No. 6,456,115, which is hereby incorporated herein by reference. This circuit could be used to implement the buffer 401. The patent provides several similar embodiments for providing a gated clock signal without requiring a flip flop or latch to do so.

In FIG. 14, circuit 9 includes elements 3 and 4 which receive both the clock and inverted clock signals CK and CK_(from inverter 5), and pass the output of the inverter to the next element only when the clock CK falls. The ENABLE signal and the clock signal CK_are then combined at the NAND gate 7 to form the output GATED CLOCK. The use of the circuit of FIG. 14 provides clock output GATED CLOCK that is gated by the input ENABLE signal and maintains clock high and low times that meet or exceed the original clock pulses on the output. The referenced patent provides several other embodiments of the circuit of FIG. 14 using, for example, NOR gates instead of NAND gates, and other modifications that provide a gated clock output signal. Additional gated clock circuitry is described in U.S. Pat. No. 6,782,486, which is also hereby incorporated by reference herein.

A common feature of certain integrated circuit logic devices is the use of multiple clocks that are multiplexed to form a selected clock for a particular section. U.S. Pat. No. 5,315,181, which is hereby incorporated by reference herein, describes a clock multiplexer circuit that may be used with one or more method embodiments of the present invention.

Advantages of the method embodiments over the clock enable schemes of the prior art accrue in several areas. For example, the methods may be used automatically in an EDA design flow, with or without the knowledge of the user. Power is saved not only by disabling the circuitry but also because, if a clock enable conversion is performed according to the method embodiments, the high fan-out clock enable signal of the prior art is removed, saving driver power as the clock enable loading is greatly reduced. Routing area is also saved and thus more routing flexibility is available for non-clock signals, since the high fan-out clock enable signals of the prior art are no longer blocking routing resources. By removing a substantial portion of the clock enable signals from the gated clock tree, both dynamic power (previously needed for driving a high fan out line) and routing area (previously needed to route the many clock enable lines) are conserved.

Further, the method embodiments include, e.g., power savings analysis steps. In these methods, changes to the routed netlist are only made when doing so would in fact save power or resources. Cost analysis is used to identify the most promising areas for a gated clock conversion, so that the limited buffer resources available in the FPGA are used in the most effective manner to conserve them.

Although described as general methods, the embodiments may be provided as stored executable instructions to a processor in a programmable computer. These instructions may be stored on a computer readable medium such as a floppy, CD, DVD, flash drive, or embedded in a computer readable file that is downloaded over a network, stored on a hard drive or in embedded memory, etc. These executable instructions cause the processor to perform the method steps described above as one way to implement the invention. The programmable processor may be part of a tool for designing integrated circuits such as a workstation, or part of a tool for programming FPGA devices such as a PC, workstation, or other computer, or part of a dedicated hardware. The methods described as embodiments herein can be provided as software, hardware, or a combination of both software and hardware including microcode, machine language instructions, and source and executable code.

Those skilled in the art will recognize that many obvious modifications to the exemplary embodiments may be made while still using the disclosed inventions. For example, some of the terms used in the foregoing and the appended claims are chosen with regards to the presently used terms in the relevant art and being used in draft standards presently in work; changes in these terms and abbreviations over time by use in industry and in standard drafting are contemplated and do not change the scope of the inventions disclosed nor limit the scope of the appended claims. These modifications are contemplated as additional embodiments, are considered as within the scope of the invention and fall within the scope of the appended claims.

What is claimed is:

1. A method for providing a design in an integrated circuit, comprising:
    providing a design netlist including synchronous elements receiving clock signals and clock enable signals on clock and clock enable routing lines;
    identifying in the design netlist groups of synchronous elements with common clock and clock enable signals;
    for a particular one of the groups, cutting the original clock routing line to the synchronous elements of the particular group;
    adding, using a processor, one or more gated clock buffers to drive a gated clock to the synchronous elements of the particular group, responsive to the original clock line, the gated clock buffer having a control input;
    coupling the clock enable signal to the control input of the gated clock buffer;
    removing the clock enable signal from the synchronous elements of the particular group; and
    removing the clock enable routing line of the particular group from the design netlist to form a modified netlist.

2. The method of claim 1, and further comprising:
    performing placement and routing of the modified netlist; and
    outputting a file for programming the integrated circuit to form a programmed integrated circuit implementing the design netlist using the modified netlist.

3. The method of claim 1, wherein identifying in the design netlist groups further comprises:
    identifying the most promising groups for saving power using a gated clock conversion.

4. The method of claim 3, wherein identifying the most promising groups further comprises identifying heavily loaded clock enable lines in the design netlist.

5. The method of claim 1, and further comprising:
    performing a power analysis on the design netlist to confirm that power is saved by the modified netlist.

6. The method of claim 5, wherein if the power saved is below a predetermined threshold, the modified netlist is discarded.

7. The method of claim 1, wherein identifying in the design netlist groups of synchronous elements with common clock and clock enable signals further comprises identifying clock enable signals that have a common clock and are logically related; and
    adding logic circuitry to the modified netlist to provide a gated clock signal common for the related clock enable signals.

8. The method of claim 1, wherein providing a design netlist including synchronous elements receiving clock signals and clock enable signals on clock and clock enable routing lines further comprises providing the design netlist with a hierarchical clock distribution network and hierarchically coupled drivers for providing clock signals and clock enable signals to synchronous elements.

9. The method of claim 8, wherein adding one or more gated clock buffers further comprises replacing one or more clock drivers in the hierarchical clock distribution network with a gated clock buffer.

10. A method for providing gated clock signals in an integrated circuit having a hierarchical clock network, comprising:
    receiving a design netlist for a circuit to be implemented in an integrated circuit, the design netlist having the hierarchical clock network having clock routing lines and having one or more clock enable signals coupled to synchronous elements in the design netlist by clock enable routing lines;
    identifying in the design netlist groups of synchronous elements with common clock and clock enable signals;
    for a particular one of the groups, cutting a portion of an original clock routing line to the synchronous elements of the particular group;
    adding, using a processor, one or more gated clock buffers to drive a gated clock on the portion of the original clock routing line to the synchronous elements of the particular group, responsive to the original clock routing line, the gated clock buffer having a control input;
    coupling the clock enable signal to the control input of the gated clock buffer;
    removing the clock enable signal from the synchronous elements of the particular group; and
    removing the clock enable routing lines of the particular group from the design netlist to form a modified netlist.

11. The method of claim 10, wherein the hierarchical network further comprises first clock drivers for driving clock signals at a first level in the hierarchy and second clock drivers for driving clock signals at a second, lower level in the hierarchy.

12. The method of claim 11, wherein adding one or more gated clock buffers further comprises replacing one or more of the first clock drivers.

13. The method of claim 11, wherein adding one or more gated clock buffers further comprises replacing one or more of the second clock drivers.

14. The method of claim 10, wherein identifying in the design netlist groups further comprises:
    identifying the most promising groups for saving power using a gated clock conversion.

15. The method of claim 14, wherein identifying the most promising groups comprises identifying heavily loaded clock enable lines in the design netlist.

16. The method of claim 10, and further comprising:
    performing a power analysis on the design netlist to confirm that power is saved by the modified netlist.

17. A non-transitory computer readable medium having executable instructions that, when executed by a programmable processor, perform the method of:
    receiving a design netlist for a circuit to be implemented in an integrated circuit, the design netlist having a hierarchical clock network including clock routing lines and having one or more clock enable signals coupled to synchronous elements in the design netlist by clock enable routing lines;
    identifying in the netlist groups of synchronous elements with common clock and clock enable signals;
    for a particular one of the groups, cutting a portion of an original clock routing line to the synchronous elements of the particular group;

adding one or more gated clock buffers to drive a gated clock to the synchronous elements on the portion of the original clock routing line, responsive to the original clock line, the gated clock buffer having a control input;

coupling the clock enable signal to the control input of the gated clock buffer;

removing the clock enable signal from the synchronous elements of the particular group; and removing the clock enable routing lines of the particular group from the design netlist to form a modified netlist.

18. The computer readable medium of claim 17, wherein the executable instructions further comprise stored instructions that, when executed by the programmable processor, perform:

identifying the most promising groups for saving power using a gated clock conversion.

19. The computer readable medium of claim 17, wherein the executable instructions further comprise stored instructions that, when executed by the programmable processor, perform identifying heavily loaded clock enable routing lines in the design netlist.

20. The computer readable medium of claim 17, wherein the executable instructions further comprise stored instructions that, when executed by the programmable processor, perform a power analysis on the modified design netlist to confirm that power is saved by the modified netlist.

* * * * *